US011861305B2

(12) United States Patent
Kato et al.

(10) Patent No.: US 11,861,305 B2
(45) Date of Patent: Jan. 2, 2024

(54) WORD PROCESSING SYSTEM AND WORD PROCESSING METHOD

(71) Applicant: HITACHI, LTD., Tokyo (JP)

(72) Inventors: Yudai Kato, Tokyo (JP); Noriko Takaya, Tokyo (JP); Takahiro Hamada, Tokyo (JP); Junya Sawazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 309 days.

(21) Appl. No.: 17/599,041

(22) PCT Filed: Dec. 7, 2020

(86) PCT No.: PCT/JP2020/045521
§ 371 (c)(1),
(2) Date: Sep. 28, 2021

(87) PCT Pub. No.: WO2022/123637
PCT Pub. Date: Jun. 16, 2022

(65) Prior Publication Data
US 2022/0350964 A1 Nov. 3, 2022

(51) Int. Cl.
*G06F 40/211* (2020.01)
*G06F 40/40* (2020.01)

(52) U.S. Cl.
CPC ............ *G06F 40/211* (2020.01); *G06F 40/40* (2020.01)

(58) Field of Classification Search
CPC .... G06F 40/211; G06F 40/40; G06F 16/3347; G06F 16/9027; G06F 40/289; G06F 40/247; G06F 40/268
See application file for complete search history.

(56) References Cited

U.S. PATENT DOCUMENTS 5,237,502 A * 8/1993 White ................... G06F 40/205
704/9
8,548,794 B2 * 10/2013 Koehn ................... G06F 40/44
704/4

(Continued)

FOREIGN PATENT DOCUMENTS

JP        2011-164772 A      8/2011

OTHER PUBLICATIONS

International Search Report, PCT/JP2020/045521, dated Feb. 16, 2021, 3 pgs.

*Primary Examiner* — Fariba Sirjani
(74) *Attorney, Agent, or Firm* — Volpe Koenig

(57) ABSTRACT

Provided is a word processing system which includes: a first generation unit which generates, based on sentence information including a plurality of sentences, hierarchy data indicating syntax tree data for each hierarchy with regard to each sentence; a second generation unit which acquires, from a plurality of hierarchy data generated by the first generation unit, hierarchy data of a second sentence similar to hierarchy data of a first sentence generated by the first generation unit, extracts a difference between the hierarchy data of the first sentence and the hierarchy data of the second sentence, and generates, as paraphrasing rule data, first expression data as a difference in the first sentence and second expression data as a difference in the second sentence; and a storage unit which stores the paraphrasing rule data generated by the second generation unit in a storage unit.

7 Claims, 13 Drawing Sheets

(56) References Cited

U.S. PATENT DOCUMENTS

| | | | | |
|---|---|---|---|---|
| 8,600,728 B2* | 12/2013 | Knight | ................ | G06F 40/154 |
| | | | | 704/4 |
| 8,694,303 B2* | 4/2014 | Hopkins | ................ | G06F 40/44 |
| | | | | 704/8 |
| 8,825,466 B1* | 9/2014 | Wang | ................ | G06F 40/45 |
| | | | | 704/7 |
| 2018/0089180 A1* | 3/2018 | Imade | ................ | G06F 40/211 |
| 2022/0350964 A1* | 11/2022 | Kato | ................ | G06F 40/268 |

\* cited by examiner

FIG. 2

Sentence Data

| Sentence Data |
|---|
| Interest rates will have an impact on stock prices in Japan. |
| Smoking will make an impact on your health. |
| Bad weather impacts flight schedules. |
| Benefit payments will promote food consumption. |
| Prefectures will request cooperation to the government. |
| ... |

FIG. 3

| Syntax tree data of each hierarchy | Vector of each hierarchy |
|---|---|
| <node lemma="have" case=""><br>  <node lemma="interest rates" case="will"/><br>  <node lemma="stock prices" case="on"/><br>  <node lemma="impact" case=""/><br></node> | (0, 1, 0, 1, 0, ..., 0) |
| <node lemma="stock prices" case="on"><br>  <node lemma="Japan" case="in"/><br></node> | (0, 0, 0, 1, 0, ..., 0) |
| ... | ... |

FIG. 4

| Expression data 1 | Expression data 2 |
|---|---|
| <node lemma="impacts" case=""/> | <node lemma="have" case=""><br>  <node lemma="impact" case=""/><br></node> |
| <node lemma="impacts" case=""/> | <node lemma="make" case=""><br>  <node lemma="impact" case=""/><br></node> |
| <node lemma="exert" case=""><br>  <node lemma="impact" case="will"/><br></node> | <node lemma="impacts" case=""/> |
| <node lemma="request" case=""/> | <node lemma="ask" case=""/> |
| ... | ... |

FIG. 5

| Relational data | Relation extraction rules data |
|---|---|
| Data related to "impact" | (.lemma=impacts&.case=""<br> (#a0.case=will)<br> (#a1.case=on)<br>) |
| Data related to "impact" | (.lemma=have&.case=""<br> (#a0.case=will)<br> (#a1.case=on)<br> (.lemma=impact&.case="")<br>) |
| Data related to "impact" | (.lemma=make&.case=""<br> (#a0.case=will)<br> (#a1.case=on)<br> (.lemma=impact&.case="")<br>) |
| Data related to "impact" | (.lemma=exert&.case=""<br> (#a0.case=will)<br> (#a1.case=on)<br> (.lemma=impact&.case=will)<br>) |
| Data related to "request" | (.lemma=request&.case=""<br> (#a0.case=will)<br> (#a1.case=on)<br> (#a2.case="")<br>) |
| ... | ... |

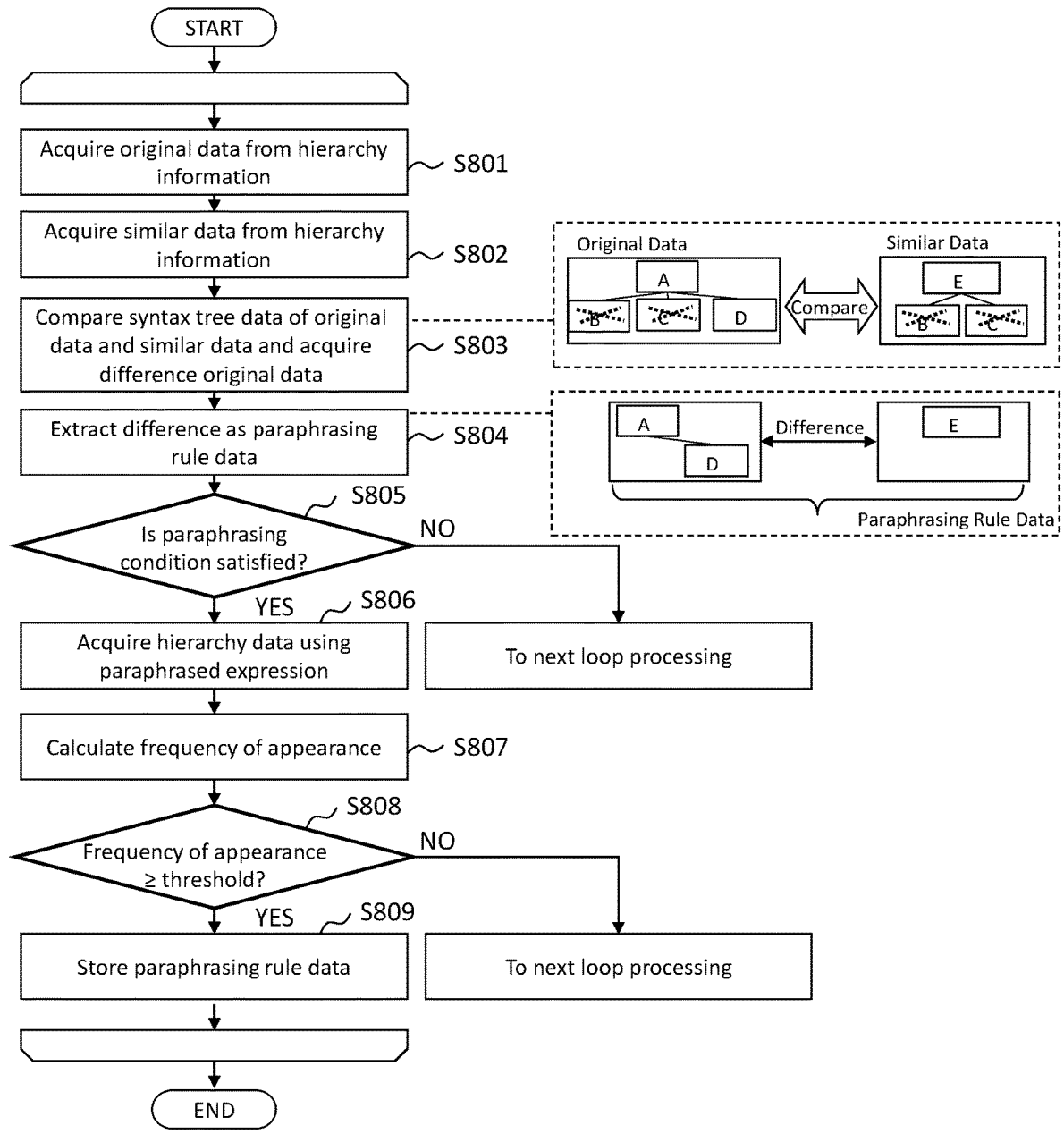

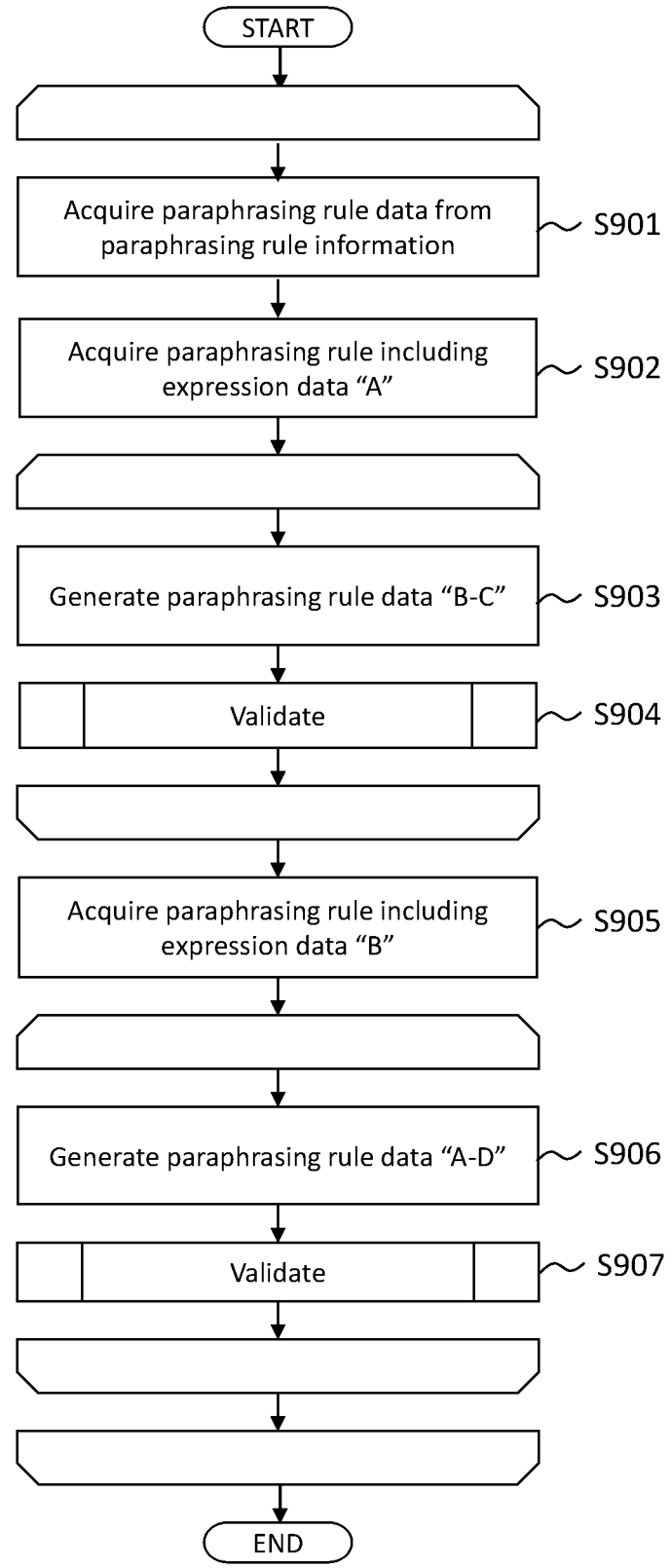

WORD PROCESSING SYSTEM AND WORD PROCESSING METHOD

TECHNICAL FIELD

The present invention generally relates to a technology of performing word processing.

BACKGROUND ART

In recent years, a relation extraction system, which is a natural language processing product, is being developed. A relation extraction system extracts the relation of phrases from the target sentence according to relation extraction rules.

When using a relation extraction system, manual rule editing is required. Rule editing is, for example, the process of generalizing the relation extraction rules so that they will conform to various sentences based on example sentences including relations. The editing of rules requires know-how, and one such know-how is the paraphrasing of expressions. As paraphrased expressions that represent the relation of the term "impact", there are, for example, "impacts", "have an impact", "make an impact", "exert an impact" and so on.

With respect to this point, disclosed is a method of searching for an example similar to a certain sentence from a collection of examples and emulating such example, and thereby generating a paraphrased sentence of that sentence (see PTL 1).

CITATION LIST

Patent Literature

[PTL 1] Japanese Unexamined Patent Application Publication No. 2011-164772

SUMMARY OF THE INVENTION

Problems To Be Solved By the Invention

With the technology described in PTL 1, the user needs to register the collection of examples before and after the paraphrasing, and, since there are numerous expressions to be paraphrased, much cost is required for registering the collection of examples.

The present invention was devised in view of the foregoing points, and an object of this invention is to propose a word processing system and the like capable of easily obtaining paraphrased expressions.

Means To Solve the Problems

In order to achieve the foregoing object, the present invention provides a word processing system which includes: a first generation unit which generates, based on sentence information including a plurality of sentences, hierarchy data indicating a syntax tree for each hierarchy with regard to each sentence; a second generation unit which acquires, from a plurality of hierarchy data generated by the first generation unit, hierarchy data of a second sentence similar to hierarchy data of a first sentence generated by the first generation unit, extracts a difference between the hierarchy data of the first sentence and the hierarchy data of the second sentence, and generates, as paraphrasing rule data, first expression data as a difference in the first sentence and second expression data as a difference in the second sentence; and a storage unit which stores the paraphrasing rule data generated by the second generation unit in a storage unit.

According to the foregoing configuration, since the difference between the hierarchy data of the first sentence and the hierarchy data of the second sentence; that is, since the first expression data of the first sentence and the second expression data of the second sentence, which is a paraphrased expression of the first expression data, are automatically generated as the paraphrasing rule data, the user can easily obtain paraphrased expressions.

Advantageous Effects of the Invention

According to the present invention, it is possible to provide a highly convenient word processing system and the like.

BRIEF DESCRIPTION OF DRAWINGS

FIG. 2 is a diagram showing an example of the corpus information according to the first embodiment.

FIG. 3 is a diagram showing an example of the hierarchy information according to the first embodiment.

FIG. 4 is a diagram showing an example of the paraphrasing rule information according to the first embodiment.

FIG. 5 is a diagram showing an example of the relation extraction rule information according to the first embodiment.

FIG. 8 is a diagram showing an example of the paraphrasing rule information generation processing according to the first embodiment.

FIG. 9 is a diagram showing an example of the addition processing according to the first embodiment.

DESCRIPTION OF EMBODIMENTS (1) First Embodiment

Figure 1:
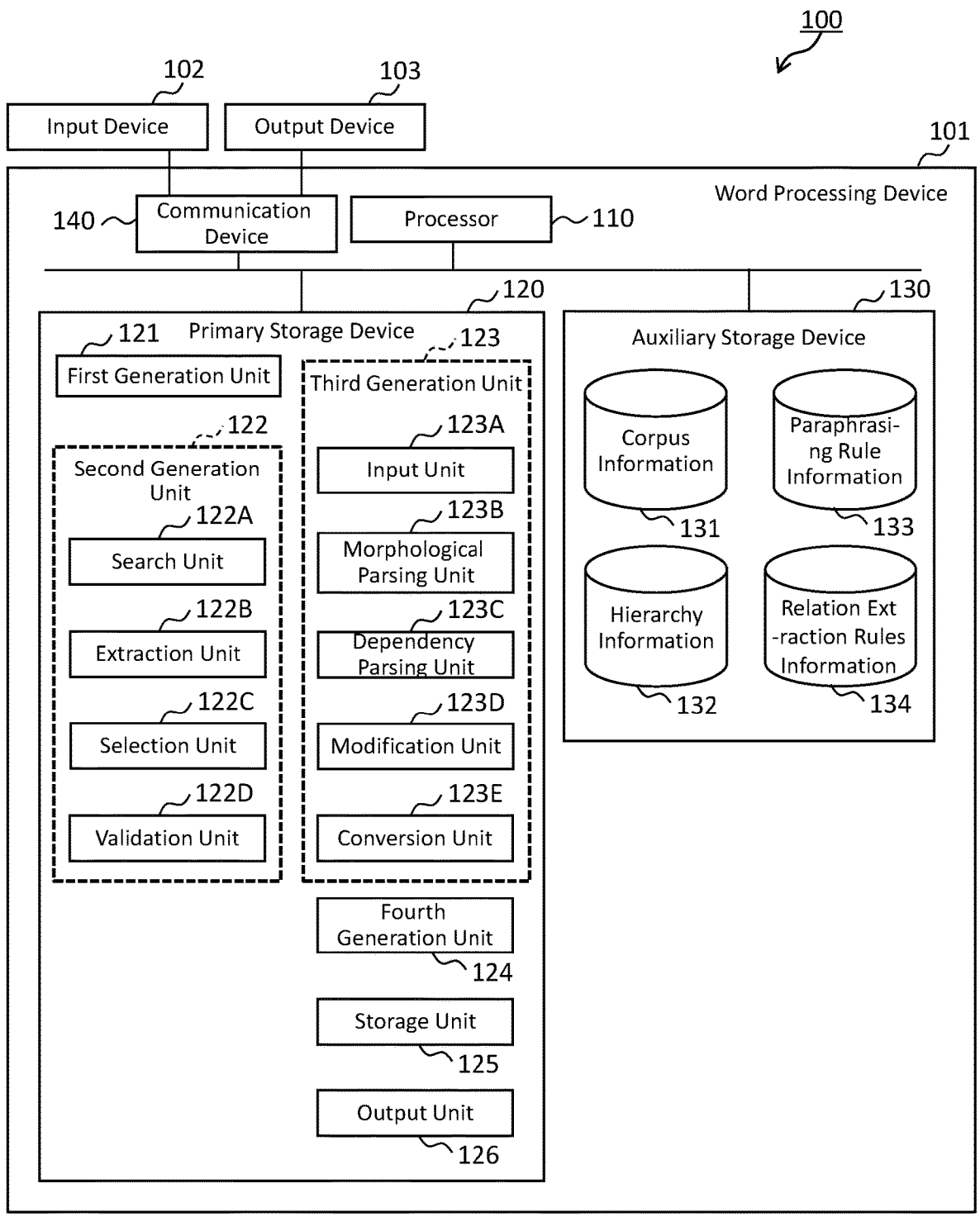
FIG. 1 is a diagram showing an example of the configuration of the word processing system according to the first embodiment.

An embodiment of the present invention is now explained in detail. The present invention, however, is not limited to the following embodiment.

The word processing system of this embodiment automatically extracts, from a plurality of sentences, a paraphrasing rule including paraphrased expressions (first expression, and a second expression as a paraphrase of the first expression). Here, the first expression and the second expression are different expressions with the same meaning. The paraphrasing rule is data retaining expressions before and after the paraphrasing.

For example, the word processing system acquires a pair of similar hierarchy data from a corpus, and extracts a difference between the acquired hierarchy data as the paraphrasing rule data. The hierarchy data is data (syntax tree data) indicating a syntax tree in which each sentence of the corpus has been divided into each hierarchy. According to the foregoing configuration, by using the syntax tree data divided into each hierarchy upon acquiring a pair of hierarchy data having a similar meaning, modifier parts and other clauses can be eliminated, and similarity of the hierarchy data can be properly determined. Moreover, for example, the word processing system extracts the paraphrasing rule data which satisfies the condition (paraphrasing condition) for selecting the paraphrasing rule data desired by the user. According to the foregoing configuration, it is possible to select the user's intended paraphrasing rule data even when a corpus is used. Moreover, for example, the word processing system extracts the paraphrasing rule data in which the frequency of appearance after the paraphrasing exceeds a threshold. According to the foregoing configuration, it is possible to avoid a situation where the paraphrasing rule data, in which the meanings are not similar, are registered.

Moreover, the word processing system generates a plurality of relation extraction rules from example sentences using the paraphrasing rule data. Here, the relation extraction rule is data indicating the rule expressing the grammatical structure for extracting the relation between phrases from the text (target sentence). According to the foregoing configuration, since the relation extraction rules can be easily generated, the user can more easily use the relation extraction system.

An embodiment of the present invention is now explained with reference to the appended drawings. The following descriptions and drawings are illustrations for explaining the present invention, and have been omitted or simplified as needed to clarify the explanation of the present invention. The present invention can also be worked in other various modes. Unless otherwise provided for herein, each constituent element may be singular or plural.

Note that, in the following explanation, the same number is assigned to the same elements in the drawings and the explanation thereof will be omitted as appropriate. Moreover, when the same types of elements are explained without being differentiated, the common part (part excluding the branch number) of the reference code including the branch number will be used, and when the same types of elements are explained by being differentiated, the reference code including the branch number may be used. For example, when the expression data are explained without any particular differentiation, they will be indicated as "expression data 410", and when the individual expression data are explained by being differentiated, they may be indicated as "expression data 410-1", "expression data 410-2" and so on.

FIG. 1 is a diagram showing an example of the configuration of the word processing system 100.

The word processing system 100 comprises a word processing device 101, an input device 102, and an output device 103.

The word processing device 101 is a computer such as a personal computer, a server device, or a tablet terminal. The word processing device 101 comprises a processor 110, a primary storage device 120, an auxiliary storage device 130, and a communication device 140.

The processor 110 is a device that performs arithmetic processing. The processor 110 is, for example, a CPU (Central Processing Unit), an MPU (Micro Processing Unit), a GPU (Graphics Processing Unit), or an AI (Artificial Intelligence) chip.

The primary storage device 120 is a device which stores programs, data and the like. The primary storage device 120 is, for example, a ROM (Read Only Memory), a RAM (Random Access Memory) or the like. The ROM is an SRAM (Static Random Access Memory), an NVRAM (Non Volatile RAM), a mask ROM (Mask Read Only Memory), a PROM (Programmable ROM) or the like. The RAM is a DRAM (Dynamic Random Access Memory) or the like.

The auxiliary storage device 130 is a hard disk drive (Hard Disk Drive), a flash memory (Flash Memory), an SSD (Solid State Drive), an optical storage device or the like. The optical storage device is a CD (Compact Disc), a DVD (Digital Versatile Disc) or the like. The programs, data and the like stored in the auxiliary storage device 130 are read from the primary storage device 120 as needed. The auxiliary storage device 130 stores corpus information 131, hierarchy information 132, paraphrasing rule information 133, relation extraction rule information 134 and the like.

The communication device 140 is a communication interface which communicates with other devices. The communication device 140 is, for example, an NIC (Network Interface Card), a wireless communication module, a USB (Universal Serial Interface) module, a serial communication module or the like. The communication device 140 can also function as an input device which receives information from other devices that are communicably connected. Moreover, the communication device 140 can also function as an output device which sends information to other devices that are communicably connected.

The functions (first generation unit 121, second generation unit 122, third generation unit 123, fourth generation unit 124, storage unit 125, output unit 126 and the like) of the word processing device 101, for example, may be realized by the processor 110 reading the programs stored in the auxiliary storage device 130 into the primary storage device 120 and executing the programs (software), or realized with hardware such as a dedicated circuit or the like, or realized by combining the software and the hardware. Moreover, the word processing device 101 may additionally comprise, in addition to the foregoing functions, for example, the functions of an operating system, a device driver, a file system, a DBMS (Data Base Management System) and the like.

The first generation unit 121 generates the hierarchy information 132 based on the corpus information 131. The second generation unit 122 generates the paraphrasing rule information 133 based on the hierarchy information 132. More specifically, the second generation unit 122 comprises a search unit 122A, an extraction unit 122B, a selection unit 122C, and a validation unit 122D.

The search unit 122A searches for second hierarchy data, which is similar to first hierarchy data, from the hierarchy information 132. The extraction unit 122B extracts a difference between the first hierarchy data and the second hierarchy data as the paraphrasing rule data. The selection unit 122C selects the paraphrasing rule data desired by the user from the paraphrasing rule data extracted by the extraction unit 122B. The validation unit 122D validates the paraphrasing rule data selected by the selection unit 122C.

The third generation unit 123 generates the relation extraction rule information 134 based on the paraphrasing rule information 133. More specifically, the third generation unit 123 comprises an input unit 123A, a morphological parsing unit 123B, a dependency parsing unit 123C, a modification unit 123D, and a conversion unit 123E.

The input unit 123A inputs a target sentence (text) according to an operation of the input device 102. The morphological parsing unit 123B divides the target sentence input from the input unit 123A into a minimum unit of language that has its own meaning (morpheme). The dependency parsing unit 123C parses the modification relation between the clauses based on the morphemes divided by the morphological parsing unit 123B, and thereby generates syntax tree data. The modification unit 123D modifies the syntax tree data generated by the morphological parsing unit 123B and the dependency parsing unit 123C into syntax tree data in which the target of extraction has been set (hereinafter sometimes referred to as "paraphrasing rules"). The conversion unit 123E converts paraphrasing rule data into relation extraction rules data by using the syntax tree data modified by the modification unit 123D.

The fourth generation unit 124 generates paraphrasing rule data based on the paraphrasing rule data stored in the paraphrasing rule information 133. The storage unit 125 stores, in the auxiliary storage device 130, the hierarchy information 132 generated by the first generation unit 121, the paraphrasing rule information 133 generated by the second generation unit 122, the relation extraction rule information 134 generated by the third generation unit 123, and the paraphrasing rule information 133 generated by the fourth generation unit 124. The output unit 126 outputs, to the output device 103, information of all or a part of the paraphrasing rule information 133, and information of all or a part of the relation extraction rule information 134.

Note that one function of the word processing device 101 may be divided into a plurality of functions, and a plurality of functions may be consolidated into one function. Moreover, a part of the functions of the word processing device 101 may be provided as a separate function, or may be included in another function. Moreover, a part of the functions of the word processing device 101 may also be realized with another computer that is able to communicate with the word processing device 101.

The input device 102 is a user interface which accepts information from the user. The input device 102 is, for example, a keyboard, a mouse, a card reader, a touch panel, a tablet terminal, a laptop computer or the like.

The output device 103 is a user interface which outputs various types of information (display output, sound output, print output or the like). The output device 103 is, for example, a display device, a sound output device (speaker), a printing device or the like which visualizes the various types of information. The display device is an LCD (Liquid Crystal Display), a graphic card or the like.

The word processing device 101 and the input device 102 are communicably connected via wired or wireless connection. The word processing device 101 and the input device 102 may be connected directly, or connected indirectly (for example, via a network). Moreover, the word processing device 101 and the input device 102 may be provided integrally, or provided separately.

The word processing device 101 and the output device 103 are communicably connected via wired or wireless connection. The word processing device 101 and the output device 103 may be connected directly, or connected indirectly (for example, via a network). Moreover, the word processing device 101 and the output device 103 may be provided integrally, or provided separately.

FIG. 2 is a diagram showing an example (corpus table 200) of the corpus information 131. Note that one or more pieces of corpus information 131 are stored in the auxiliary storage device 130 before the operation of the word processing system 100 (for example, at the time of introduction thereof) by the user or the system administrator via the input device 102.

The corpus table 200 stores extensive data of sentences (sentence data) used in texts, sounds, videos and the like. For example, the corpus table 200 stores various types of sentence data collected from WEB (World Wide Web) sites, theses, newspaper articles and the like.

FIG. 3 is a diagram showing an example (hierarchy table 300) of the hierarchy information 132.

The data (syntax tree data 310) indicating a syntax tree for each hierarchy generated from the sentence data stored in the corpus table 200 and the vector (syntax tree vector 320) indicating that syntax tree are associated and stored in the hierarchy table 300. The syntax tree data 310 retains, in an XML (Extensible Markup Language) format, a tree structure for each hierarchy. The syntax tree vector 320 retains data in a binary format.

Here, the tag "<node . . . >" in the syntax tree of the word processing system 100 indicates a node. For example, in a record 330 of the hierarchy table 300, the node "have" in the first line indicates a parent node. Moreover, the node "interest rates will" in the second line, the node "stock prices on" in the third line, and the node "impact" on the fourth line indicate child nodes.

Moreover, "<attribute>=<attribute value>" in the tag indicates the attribute and the attribute value that can be set in the node. For example, the attribute "lemma" indicates a lemma. Note that, in a lemma, the past form "had" is deemed the present form "have". Moreover, for example, the attribute "case" indicates a postpositional particle.

Note that the format of retaining data is not limited to the foregoing formats, and may be other formats. Moreover, the method of generating the syntax tree data 310 and the syntax tree vector 320 will be explained later with reference to FIG. 7A, FIG. 7B and so on.

FIG. 4 is a diagram showing an example (paraphrasing rule table 400) of the paraphrasing rule information 133.

A first expression (expression data 410-1) and a second expression (expression data 410-2), which is a paraphrased expression of the first expression, are associated and stored as the paraphrasing rule data in the paraphrasing rule table 400. The expression data 410 is retaining a tree structure of the expression data 410 in an XML format. Note that the method of generating the expression data 410 will be explained later with reference to FIG. 8 and so on.

FIG. 5 is a diagram showing an example (relation extraction rule table 500) of the relation extraction rule information 134.

The relation (relational data 510) set by the user and the relation extraction rule (relation extraction rules data 520) generated based on the paraphrasing rule table 400 are associated and stored in the relation extraction rule table 500. The relation extraction rules data 520 is retaining a tree structure of the relation extraction rules data 520.

Here, in "(condition of node 1 (condition of node 2) (condition of node 3) . . . )" of the relation extraction rules data 520, the node 1 indicates a parent node, and the node 2, the node 3, . . . indicate the child nodes. "<attribute>=<attribute value>" in the relation extraction rules data 520 indicates the definition of the attribute and the attribute value that can be set in the node. "#a<number>" in the relation extraction rules data 520 indicates the target (phrase) to be extracted when the relation extraction rule is a match.

For example, the relation extraction rules data 521 indicates that the relation extraction rule matches the following syntax tree.

The lemma of the parent node is "make", and there is no postpositional particle

The lemma of the first child node is arbitrary, and the postpositional particle is "will"

The lemma of the second child node is arbitrary, and the postpositional particle is "on"

The lemma of the third child node is "impact", and there is no postpositional particle Note that the method of generating the relation extraction rules data 520 will be explained later with reference to FIG. 10 and so on.

Figure 6:
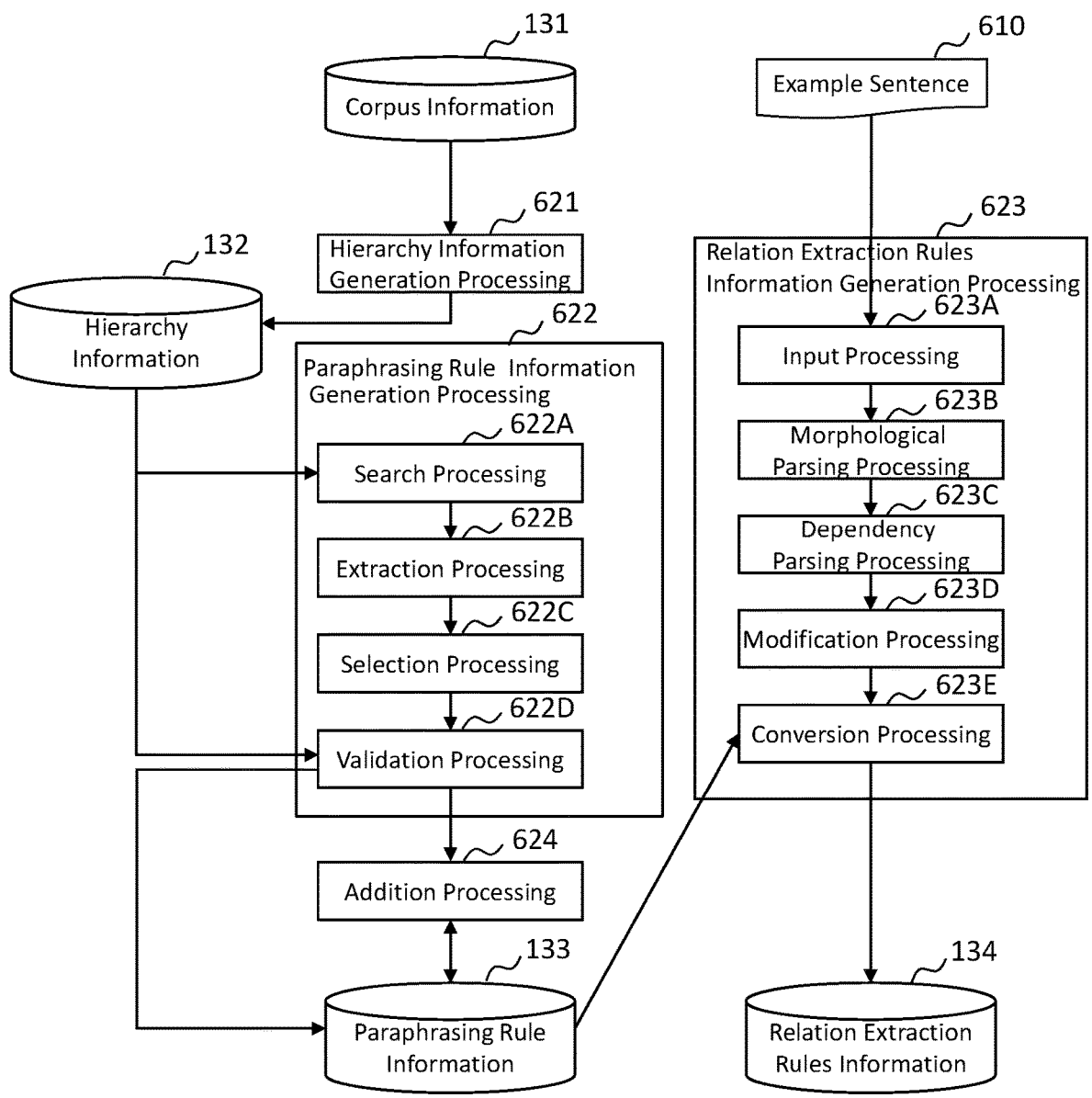
FIG. 6 is a diagram showing an example of the processing performed by the word processing device according to the first embodiment.

FIG. 6 is a diagram showing an example of the processing performed by the word processing device 101.

The first generation unit 121 of the word processing device 101 performs hierarchy information generation processing 621 of generating the hierarchy information 132 from the corpus information 131. More specifically, in the hierarchy information generation processing 621, the first generation unit 121 generates hierarchy data in which each sentence data of the corpus information 131 is divided into each hierarchy of the syntax tree. The hierarchy information generation processing 621 will be explained later with reference to FIG. 7A and FIG. 7B.

The second generation unit 122 of the word processing device 101 performs paraphrasing rule information generation processing 622 of generating the paraphrasing rule information 133 from the hierarchy information 132. The paraphrasing rule information generation processing 622 is configured by including search processing 622A, extraction processing 622B, selection processing 622C, and validation processing 622D.

The search processing 622A is, for example, processing to be performed by the search unit 122A. The search processing 622A will be explained later with reference to S801 and S802 of FIG. 8. The extraction processing 622B is, for example, processing to be performed by the extraction unit 122B. The extraction processing 622B will be explained later with reference to S803 and S804 of FIG. 8. The selection processing 622C is, for example, processing to be performed by the selection unit 122C. The selection processing 622C will be explained later with reference to S805 of FIG. 8. The validation processing 622D is, for example, processing to be performed by the validation unit 122D. The validation processing 622D will be explained later with reference to S806 to S809 of FIG. 8.

The third generation unit 123 of the word processing device 101 performs relation extraction rule information generation processing 623 of generating the relation extraction rule information 134 from the paraphrasing rule information 133, and the example sentence 610 including the relation. The relation extraction rule information generation processing 623 is configured by including input processing 623A, morphological parsing processing 623B, dependency parsing processing 623C, modification processing 623D, and conversion processing 623E.

The input processing 623A is, for example, processing to be performed by the input unit 123A. The input processing 623A will be explained later with reference to S1001 of FIG. 10. The morphological parsing processing 623B is, for example, processing to be performed by the morphological parsing unit 123B. The morphological parsing processing 623B will be explained later with reference to S1002 of FIG. 10. The dependency parsing processing 623C is, for example, processing to be performed by the dependency parsing unit 123C. The dependency parsing processing 623C will be explained later with reference to S1002 of FIG. 10. The modification processing 623D is, for example, processing to be performed by the modification unit 123D. The modification processing 623D will be explained later with reference to S1003 of FIG. 10. The conversion processing 623E is, for example, processing to be performed by the conversion unit 123E. The conversion processing 623E will be explained later with reference to S1004 to S1006 of FIG. 10.

The fourth generation unit 124 of the word processing device 101 performs addition processing 624 of generating the paraphrasing rule information 133 from the paraphrasing rule information 133. The addition processing 624 is, for example, processing to be performed by the fourth generation unit 124. The addition processing 624 will be explained later with reference to FIG. 9.

Figure 7A:
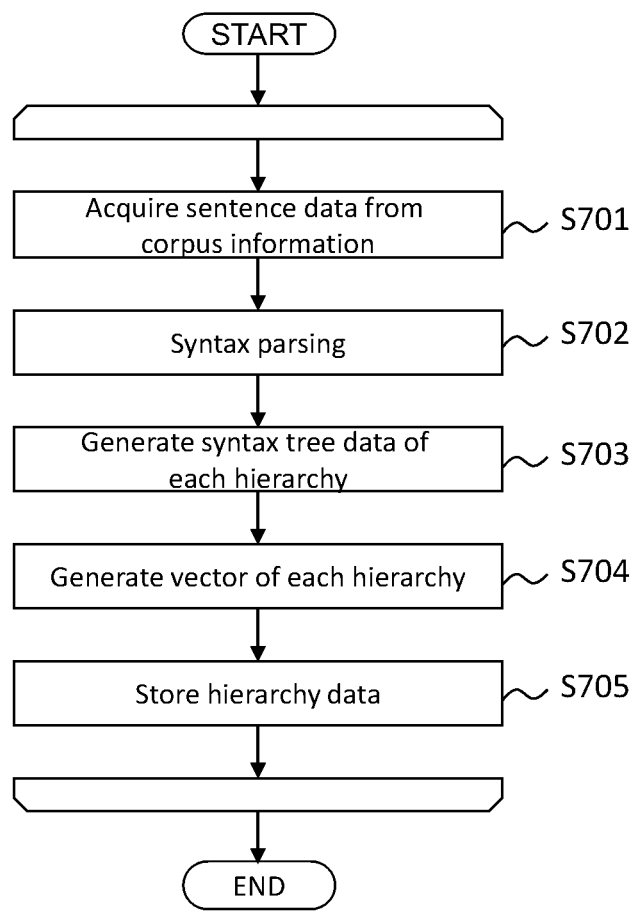
FIG. 7A is a diagram showing an example of the hierarchy information generation processing according to the first embodiment.
Figure 7B:
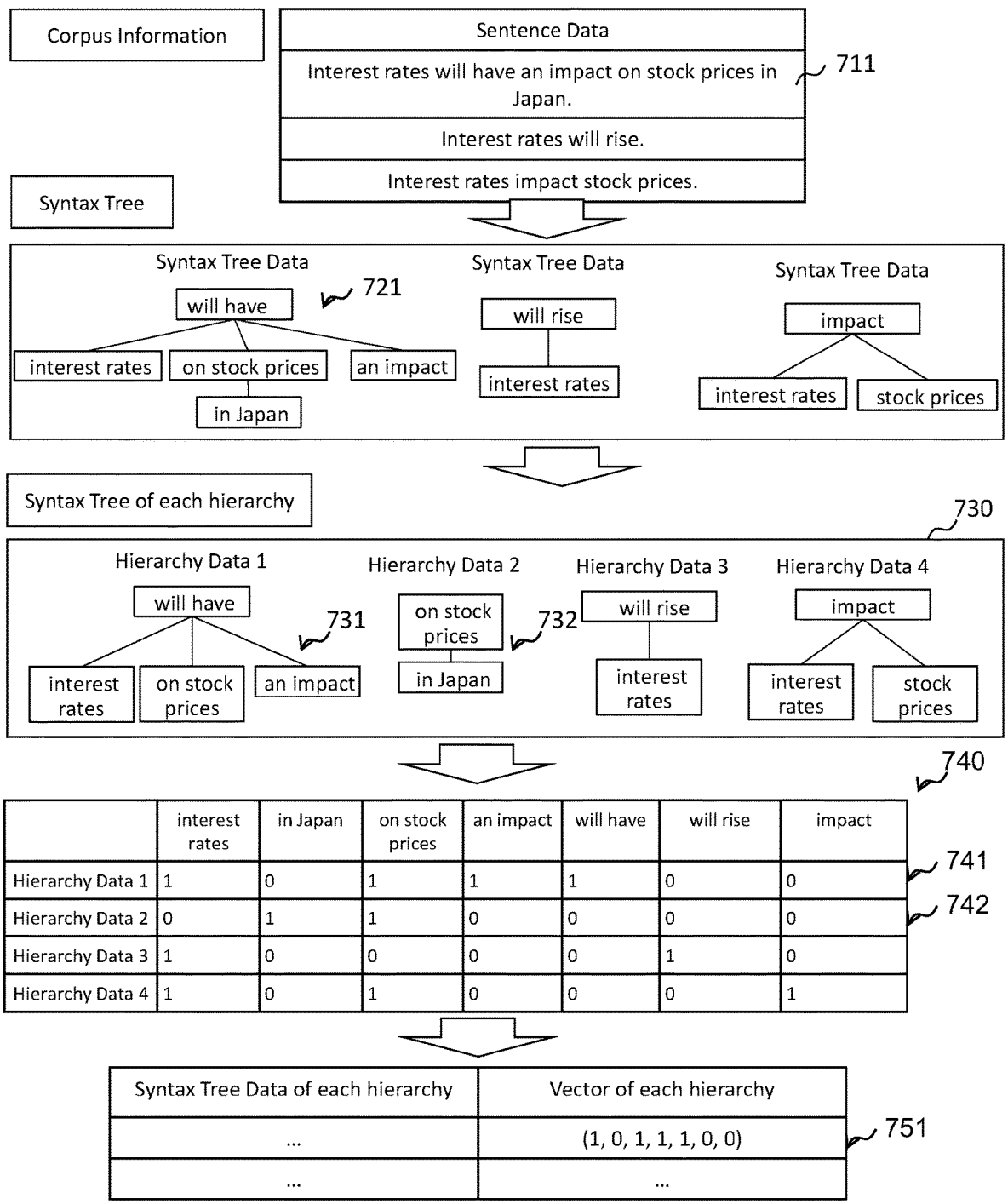
FIG. 7B is a diagram showing the generated image of the hierarchy data according to the first embodiment.

FIG. 7A is a diagram showing an example of the hierarchy information generation processing 621. The hierarchy information generation processing 621 is started, for example, at the timing instructed by the user via the input device 102. In the hierarchy information generation processing 621, the processing of S701 to S705 is performed for each sentence data included in the corpus information 131. In the following explanation, the processing of S701 to S705 is explained with reference to FIG. 7B as needed. FIG. 7B is a diagram showing the generated image of the hierarchy data.

In S701, the word processing device 101 acquires one unprocessed sentence data from the corpus information 131. For example, the word processing device 101 acquires the sentence data 711 "Interest rates will have an impact on stock prices in Japan" shown in FIG. 7B.

In S702, the word processing device 101 performs syntax parsing (morphological parsing and dependency parsing) regarding the sentence data acquired in S701, and thereby generates syntax tree data. For example, the word processing device 101 generates the syntax tree data 721 from the sentence data 711.

In S703, the word processing device 101 generates syntax tree data for each hierarchy. For example, the word processing device 101 generates the syntax tree data 731 and the syntax tree data 732 for each hierarchy from the syntax tree data 721. As a result of the word processing device 101 dividing the syntax tree for each hierarchy as described above, it is possible to eliminate modifier parts and other unneeded clauses, and facilitate the acquisition of similar expression data.

In S704, the word processing device 101 generates a vector of the syntax tree data for each hierarchy. For example, the word processing device 101 generates a vector 741 of syntax tree data 731 and a vector 742 of syntax tree data 732. Since the clauses of "will have" "interest rates" "on stock prices" "an impact" are individually included (i.e., one clause each) in the syntax tree data 731, the word processing device 101 sets the frequency "1" to the corresponding position of the clause in the vector 741. Note that the word processing device 101 can compare the vectors without having to retain information for identifying the clauses by listing all clauses and fixing the positions of the clauses.

In S705, the word processing device 101 stores hierarchy data. For example, the word processing device 101 stores the syntax tree data 731, and the vector 741 of the syntax tree data 731, as the hierarchy data 751 in the hierarchy information 132.

FIG. 8 is a diagram showing an example of the paraphrasing rule information generation processing 622. The paraphrasing rule information generation processing 622 is performed subsequent to the hierarchy information generation processing 621. In the paraphrasing rule information generation processing 622, the processing of S801 to S809 is performed with regard to each hierarchy data included in the hierarchy information 132.

In S801, the word processing device 101 acquires one unprocessed hierarchy data from the hierarchy information 132. In the following explanation, the hierarchy data acquired by the word processing device 101 in S801 is hereinafter referred to as "original data".

In S802, the word processing device 101 acquires hierarchy data which is similar to the vector of the original data from the hierarchy information 132 (this data is hereinafter referred to as "similar data"). For example, the word processing device 101 calculates the similarity between the original data and all hierarchy data, and uses the most similar hierarchy data as the similar data. The similarity may be a cosine similarity or a Euclidean distance, or a value calculated based on other calculation methods.

In S803, the word processing device 101 compares the syntax tree data of the original data and the similar data, and acquires the difference of both data (original data and similar data). More specifically, the word processing device 101 deletes the same nodes existing in both data. For example, in a case where the parent node of the original data is "A" and the child nodes of the original data are "B", "C" and "D", and the parent node of the similar data is "E" and the child nodes of the similar data are "B" and "C", the common nodes "B" and "C" are deleted from both data.

In S804, the word processing device 101 extracts the difference between both data as the paraphrasing rule data. For example, in the foregoing case, expression data (parent node "A" of the original data and child node "D" of the original data) as the difference in the original data and expression data (parent node "E" of the similar data) as the difference in the similar data are extracted as the paraphrasing rule data.

In S805, the word processing device 101 determines whether the paraphrasing rule data extracted in S804 satisfies the paraphrasing condition. The word processing device 101 proceeds to the processing of S806 upon determining that the paraphrasing rule data satisfies the paraphrasing condition, proceeds to the processing of S801 upon determining that the paraphrasing rule data does not satisfy the paraphrasing condition or when there is unprocessed hierarchy data, and ends the paraphrasing rule information generation processing 622 when there is no unprocessed hierarchy data.

As the paraphrasing condition, considered may be the paraphrasing of a part of speech such as the paraphrasing of a verb or the paraphrasing of an adjective. For example, when the paraphrasing of a verb has been set by the user via the input device 102, the word processing device 101 determines that the paraphrasing condition is satisfied when the parent nodes of both data are verbs and the parent nodes of both data are different. Moreover, for example, when the paraphrasing of an adjective has been set by the user via the input device 102, the word processing device 101 determines that the paraphrasing condition is satisfied when the parent nodes of both data are adjectives and the parent nodes of both data are different.

In S806, the word processing device 101 acquires, from the hierarchy information 132, all hierarchy data using one expression data of the paraphrasing rule data determined as satisfying the paraphrasing condition in S805.

In the following explanation, described is a case where the word processing device 101 acquires the expression data of the original data, as one expression data, when the paraphrasing rule data determined as satisfying the paraphrasing condition in S805 is the paraphrasing rule data in which the expression data of the original data is (parent node "will have" and child node "an impact"), and the expression data of the similar data is (parent node "impacts"). For example, when the first hierarchy data (parent node "will have" and child nodes "strong yen" "an impact" "on stock prices") and the second hierarchy data (parent node "will have" and child nodes "an impact" "on one's life") are included in the hierarchy information 132, the word processing device 101 acquires, from the hierarchy information 132, the first hierarchy data and the second hierarchy data using the expression data of the original data.

Note that, while the frequency of appearance is calculated in S807 in relation to one expression data, since the frequency of appearance will be of the same value whether it is the expression data of the original data or the expression data of the similar data, the expression data of the original data or the expression data of the similar data may be used as the one expression data.

In S807, the word processing device 101 paraphrases the syntax tree data of the hierarchy data extracted in S806 and calculates the frequency of appearance.

For example, the word processing device 101 confirms whether the expression data (parent node "impacts" and child nodes "strong yen" "on stock prices") obtained by paraphrasing the syntax tree data (parent node "will have" and child nodes "strong yen" "an impact" "on stock prices") of the extracted first hierarchy data using the paraphrasing rule data (parent node "will have" and child node "an impact"-parent node "impacts") determined as satisfying the paraphrasing condition in S805 is included in the hierarchy information 132.

Moreover, for example, the word processing device 101 confirms whether the expression data (parent node "will have" and child nodes "an impact" "on one's life") obtained by paraphrasing the syntax tree data (parent node "will have" and child nodes "an impact" "on one's life") of the extracted second hierarchy data using the paraphrasing rule data (parent node "will have" and child node "an impact"-parent node "impacts") determined as satisfying the paraphrasing condition in S805 is included in the hierarchy information 132.

Subsequently, the word processing device 101 counts the number of expression data obtained by paraphrasing the syntax tree data of the first hierarchy data using the paraphrasing rule data included in the hierarchy information 132, and the number of expression data obtained by paraphrasing the syntax tree data of the second hierarchy data using the paraphrasing rule data included in the hierarchy information 132, and uses the result as the frequency of appearance.

In S808, the word processing device 101 determines whether the frequency of appearance is equal to or greater than a threshold. The word processing device 101 proceeds to the processing of S809 upon determining that the frequency of appearance is equal to or greater than the threshold, proceeds to the processing of S801 upon determining that the frequency of appearance is less than the threshold or when there is unprocessed hierarchy data, and ends the paraphrasing rule information generation processing 622 when there is no unprocessed hierarchy data. Note that the threshold is set by the user via the input device 102 before the processing of S808 is performed.

In S809, the word processing device 101 stores, in the paraphrasing rule information 133, the paraphrasing rule data determined as satisfying the paraphrasing condition in S805, proceeds to the processing of S801 when there is unprocessed hierarchy data, and ends the paraphrasing rule information generation processing 622 when there is no unprocessed hierarchy data.

FIG. 9 is a diagram showing an example of the addition processing 624. The addition processing 624 is performed at a suitable timing. A suitable timing may be the timing that the paraphrasing rule information generation processing 622 has ended, the timing designated by the user, periodic, the timing designated in advance, or any other timing. In the addition processing 624, the processing of S902 to S907 is performed with regard to each hierarchy data included in the hierarchy information 132.

In S901, the word processing device 101 acquires one unprocessed paraphrasing rule data from the paraphrasing rule information 133. In the following explanation, described is a case where the paraphrasing rule data "A-B" is acquired in S901, and the paraphrasing rule data "A-C" and the paraphrasing rule data "B-D" have previously been stored in the paraphrasing rule information 133.

When the paraphrasing rule data "A-B" is acquired in S901, since the expression data "A" and the expression data "B" have a similar meaning, and the expression data "A" and the expression data "C" have a similar meaning, there is a possibility that the expression data "B" and the expression data "C" are similar. In S902 to S904, whether the paraphrasing rule data "B-C" has a similar meaning is validated, and, when it is determined as being similar as a result of the validation, the paraphrasing rule data "B-C" is stored in the paraphrasing rule information 133.

In S902, the word processing device 101 acquires, from the paraphrasing rule information 133, the paraphrasing rule data including the expression data "A" of the paraphrasing rule data acquired in S901. The word processing device 101 performs the processing of S903 and S904 with regard to each of the acquired paraphrasing rule data.

In S903, the word processing device 101 generates the paraphrasing rule data "B-C" obtained by combining the expression data "C" and the expression data "B", which are not on the side of the expression data "A" of the paraphrasing rule data acquired in S902.

In S904, the word processing device 101 validates the paraphrasing rule data "B-C" generated in S903. More specifically, the word processing device 101 performs the processing of S806 to S809.

Moreover, when the paraphrasing rule data "A-B" is acquired in S901, since the expression data "A" and the expression data "B" have a similar meaning, and the expression data "B" and the expression data "D" have a similar meaning, there is a possibility that the expression data "A" and the expression data "D" are similar. In S905 to S907, whether the paraphrasing rule data "A-D" has a similar meaning is validated, and, when it is determined as being similar as a result of the validation, the paraphrasing rule data "A-D" is stored in the paraphrasing rule information 133.

In S905, the word processing device 101 acquires, from the paraphrasing rule information 133, the paraphrasing rule data including the expression data "B" of the paraphrasing rule data acquired in S901. The word processing device 101 performs the processing of S906 and S907 with regard to each of the acquired paraphrasing rule data.

In S906, the word processing device 101 generates the paraphrasing rule data "A-D" obtained by combining the expression data "D" and the expression data "A", which are not on the side of the expression data "B" of the paraphrasing rule data acquired in S905.

In S907, the word processing device 101 validates the paraphrasing rule data "A-D" generated in S903. More specifically, the word processing device 101 performs the processing of S806 to S809.

Figure 10:
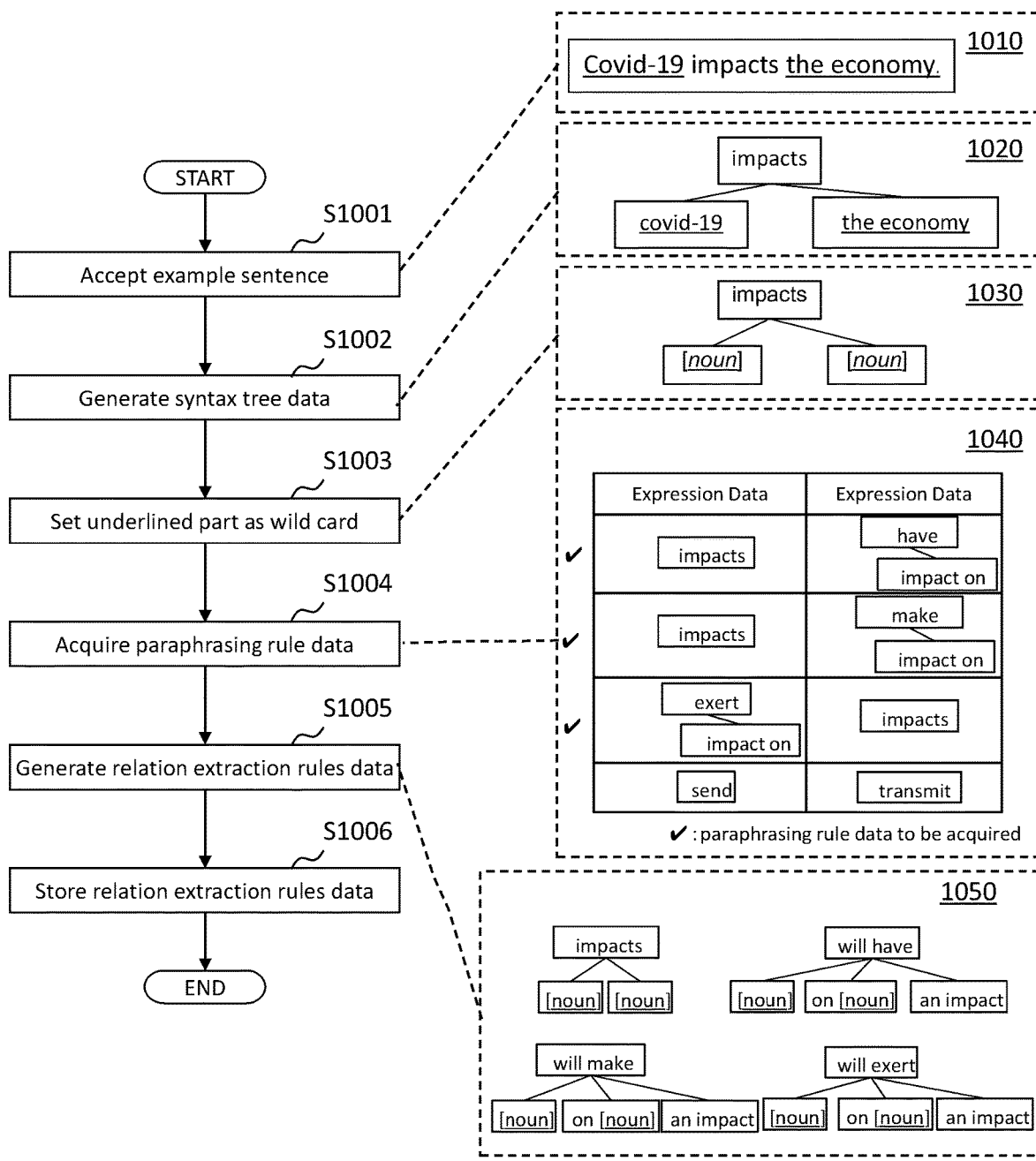
FIG. 10 is a diagram showing an example of the relation extraction rule information generation processing according to the first embodiment.

FIG. 10 is a diagram showing an example of the relation extraction rule information generation processing 623. The relation extraction rule information generation processing 623 is started, for example, at the timing designated by the user via the input device 102.

In S1001, the word processing device 101 accepts an example sentence from the user. For example, the example sentence 1010 is input from the user via the input device 102. In the example sentence 1010, a mark (underline in this example) is affixed to the phrase that the user wishes to extract.

In S1002, the word processing device 101 performs syntax parsing, and generates syntax tree data of the example sentence accepted in S1001. For example, the word processing device 101 generates the syntax tree data 1020 of the example sentence 1010.

In S1003, the word processing device 101 generates syntax tree data (paraphrasing rules data) in which the underlined part of the syntax tree data generated in S1002 is set as a wild card. For example, the word processing device 101 sets the underlined part of the syntax tree data 1020 as a wild card "[noun]", and generates the paraphrasing rules data 1030.

In S1004, the word processing device 101 acquires the paraphrasing rule data from the paraphrasing rule information 133. The word processing device 101 acquires, from the paraphrasing rule information 133, the paraphrasing rule data 1040 that can be applied to the paraphrasing rules data 1030 generated from the example sentence 1010. For example, the word processing device 101 acquires the paraphrasing rule data 1040 of the expression data including the node "impacts" in which a wild card has not been set in the paraphrasing rules data 1030.

In S1005, the word processing device 101 applies the paraphrasing rules data generated in S1003 to the paraphrasing rule data acquired in S1004, and thereby generates relation extraction rules data. For example, the word processing device 101 applies the paraphrasing rules data 1030 to the paraphrasing rule data 1040, and thereby generates the relation extraction rules data 1050.

In S1006, the word processing device 101 stores, in the relation extraction rule information 134, the relation extraction rules data generated in S1005.

Figure 11:
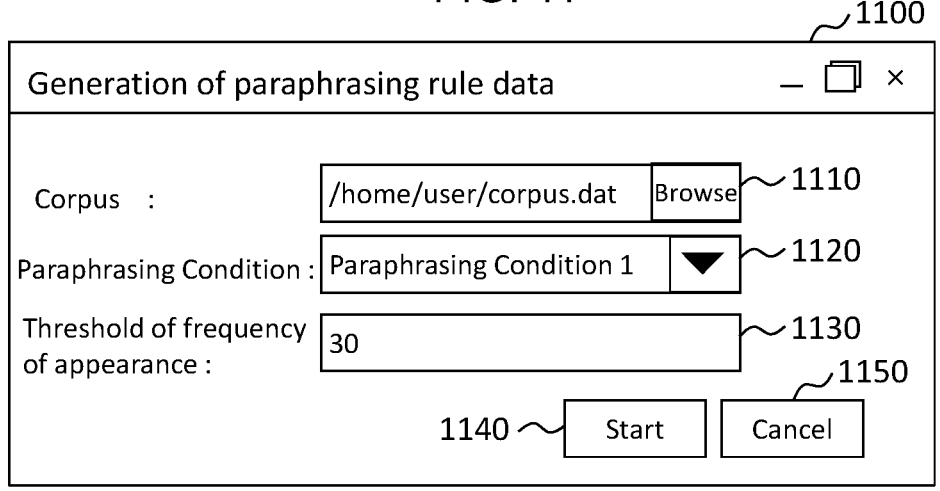
FIG. 11 is a diagram showing an example of the screen according to the first embodiment.

FIG. 11 is a diagram showing an example (screen 1100) of the screen for generating the paraphrasing rule data. The screen 1100 is displayed on the output device 103 according to the user's operation of the input device 102.

The screen 1100 is configured by including a selection part 1110, a selection part 1120, a setting part 1130, a start button 1140, and a cancel button 1150. The selection part 1110 is an example of the user interface for the user to select the corpus information 131 as the target for which the paraphrasing rule data is to be generated from a plurality of pieces of corpus information 131. The selection part 1120 is an example of the user interface for the user to select, upon limiting the paraphrasing rule data that the user wishes to extract, the paraphrasing condition to be used for the limitation from a plurality of paraphrasing conditions.

The setting part 1130 is an example of the user interface for the user to set a threshold of the frequency of appearance. The start button 1140 is an example of the user interface for the user to instruct the start of the generation of the paraphrasing rule data. When the start button 1140 is pressed by the user, the hierarchy information generation processing 621 is started. The cancel button 1150 is an example of the user interface for the user to instruct the cancellation of the generation of the paraphrasing rule data.

Figure 12:
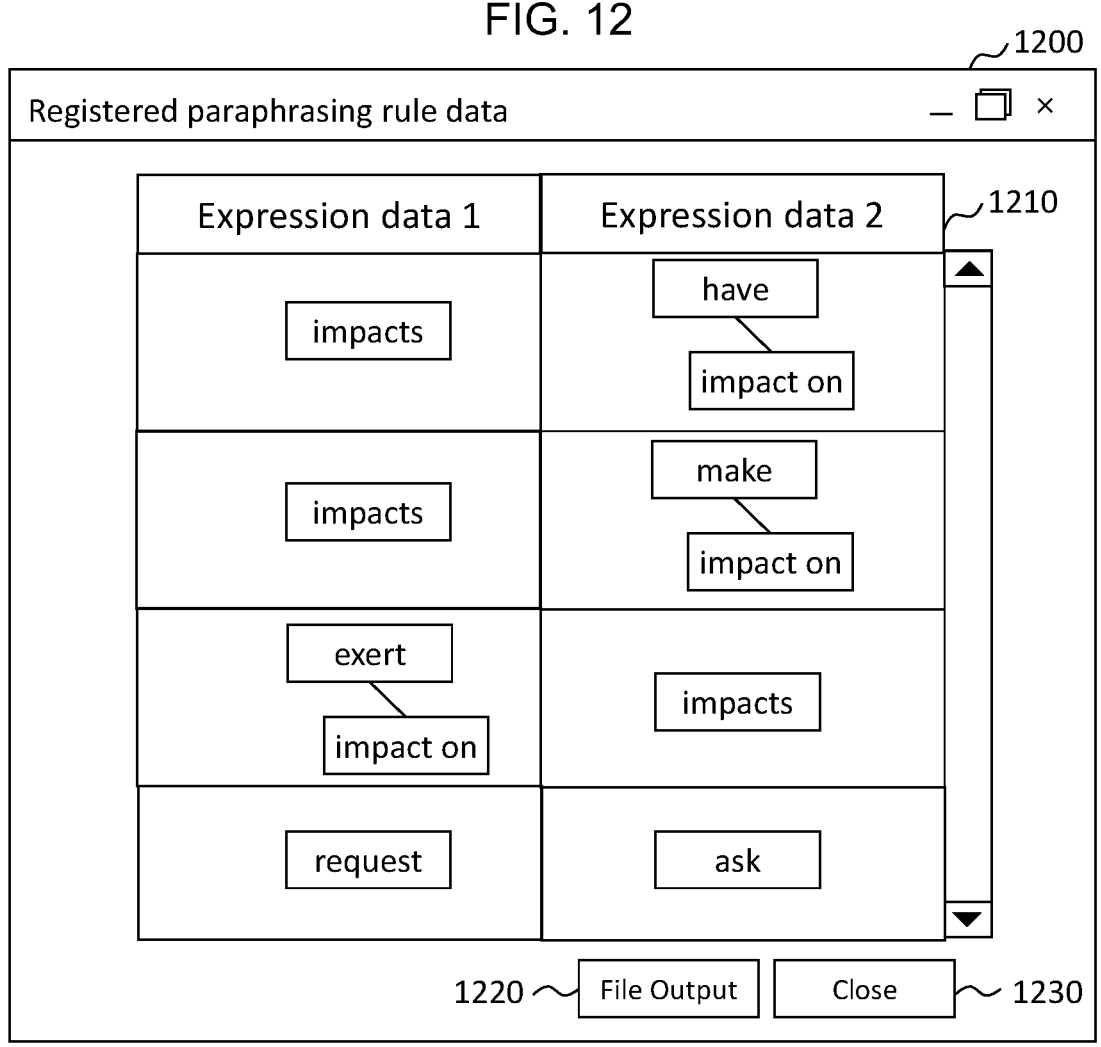
FIG. 12 is a diagram showing an example of the screen according to the first embodiment.

FIG. 12 is a diagram showing an example (screen 1200) of the screen for displaying the paraphrasing rule data. The screen 1200 is displayed on the output device 103 according to the user's operation of the input device 102.

The screen 1200 comprises a display part 1210, a file output button 1220, and an end button 1230. The display part 1210 is an example of the user interface for the user to display the paraphrasing rule data stored in the paraphrasing rule information 133. The file output button 1220 is an example of the user interface for the user to output the paraphrasing rule data stored in the paraphrasing rule information 133 as a file. The end button 1230 is an example of the user interface for the user to close the screen 1200.

According to the screen 1200, the user can confirm all or a part of the paraphrasing rule data stored in the paraphrasing rule information 133, or output the paraphrasing rule data as a file.

Figure 13:
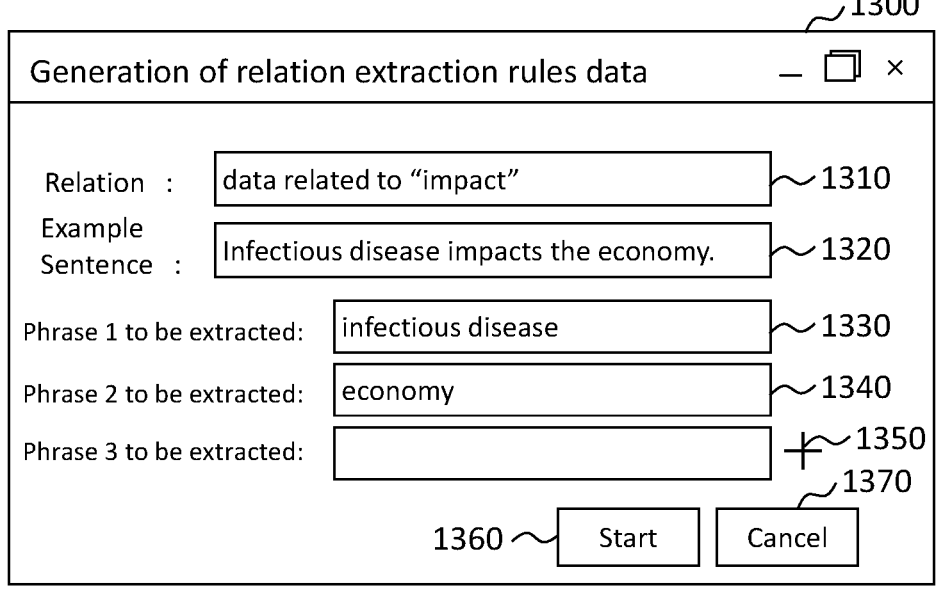
FIG. 13 is a diagram showing an example of the screen according to the first embodiment.

FIG. 13 is a diagram showing an example (screen 1300) of the screen for generating the relation extraction rules data. The screen 1300 is displayed on the output device 103 according to the user's operation of the input device 102.

The screen 1300 comprises input parts 1310 to 1340, an input addition button 1350, a start button 1360, and a cancel button 1370. The input part 1310 is an example of the user interface for the user to input the relation used for the classification of the relation extraction rules data. The input part 1320 is an example of the user interface for the user to input an example sentence. The input part 1330 is an example of the user interface for the user to input a first phrase extracted from the example sentence input to the input part 1320. The input part 1340 is an example of the user interface for the user to input a second phrase extracted from the example sentence input to the input part 1320.

The input addition button 1350 is an example of the user interface for the user to add the column to which the extracted phrase is input. The start button 1360 is an example of the user interface for the user to instruct the start of the generation of the relation extraction rules data. When the start button 1360 is pressed by the user, the relation extraction rule information generation processing 623 is started. The cancel button 1150 is an example of the user interface for the user to instruct the cancellation of the generation of the paraphrasing rule data.

Figure 14:
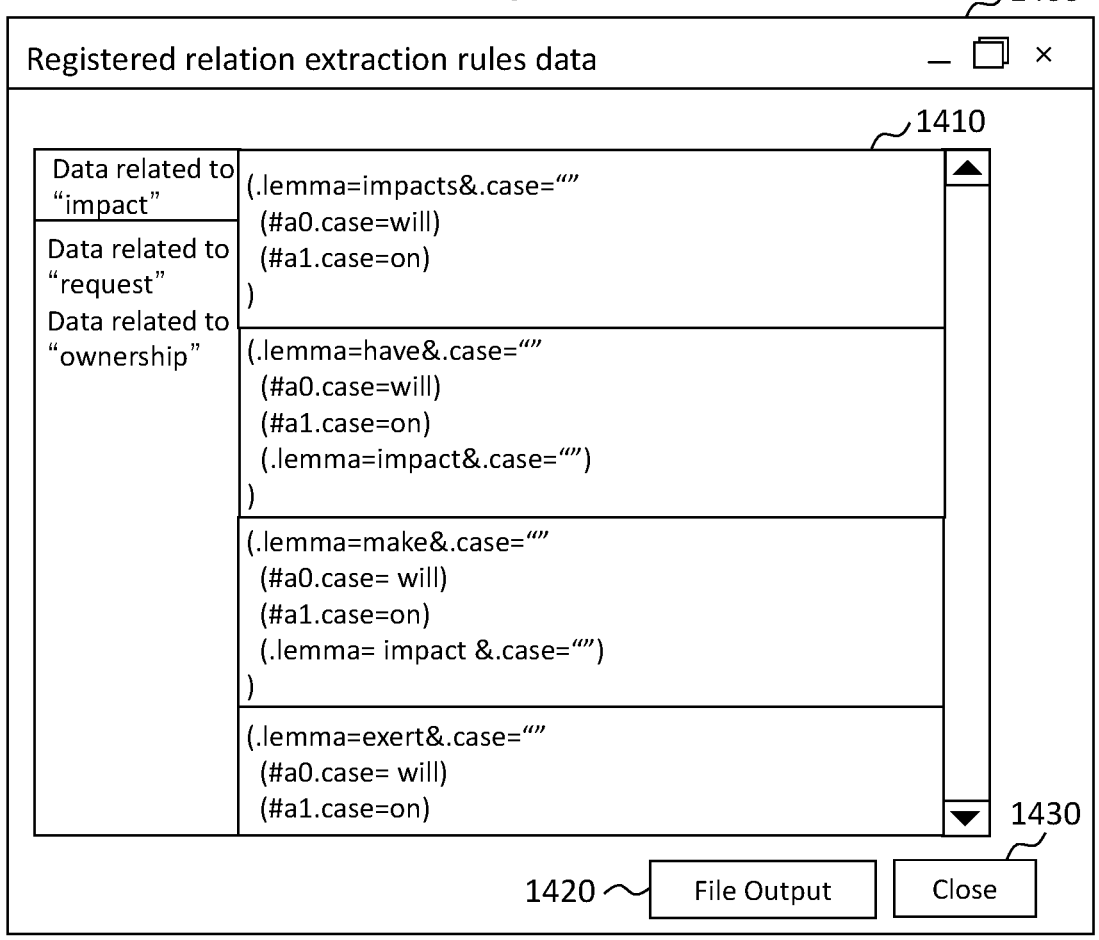
FIG. 14 is a diagram showing an example of the screen according to the first embodiment.

FIG. 14 is a diagram showing an example (screen 1400) of the screen for displaying the relation extraction rules data. The screen 1400 is displayed on the output device 103 according to the user's operation of the input device 102.

The screen 1400 comprises a display part 1410, a file output button 1420, and an end button 1430. The display part 1410 is an example of the user interface for the user to display, for each relation input by the user, the relation extraction rules data stored in the relation extraction rule information 134. The file output button 1420 is an example of the user interface for the user to output the relation extraction rules data stored in the relation extraction rule information 134 as a file. The end button 1430 is an example of the user interface for the user to close the screen 1400.

According to the screen 1400, the user can confirm the relation extraction rules data stored in the relation extraction rule information 134 or output the relation extraction rules data as a file for each input relation.

Figure 15:
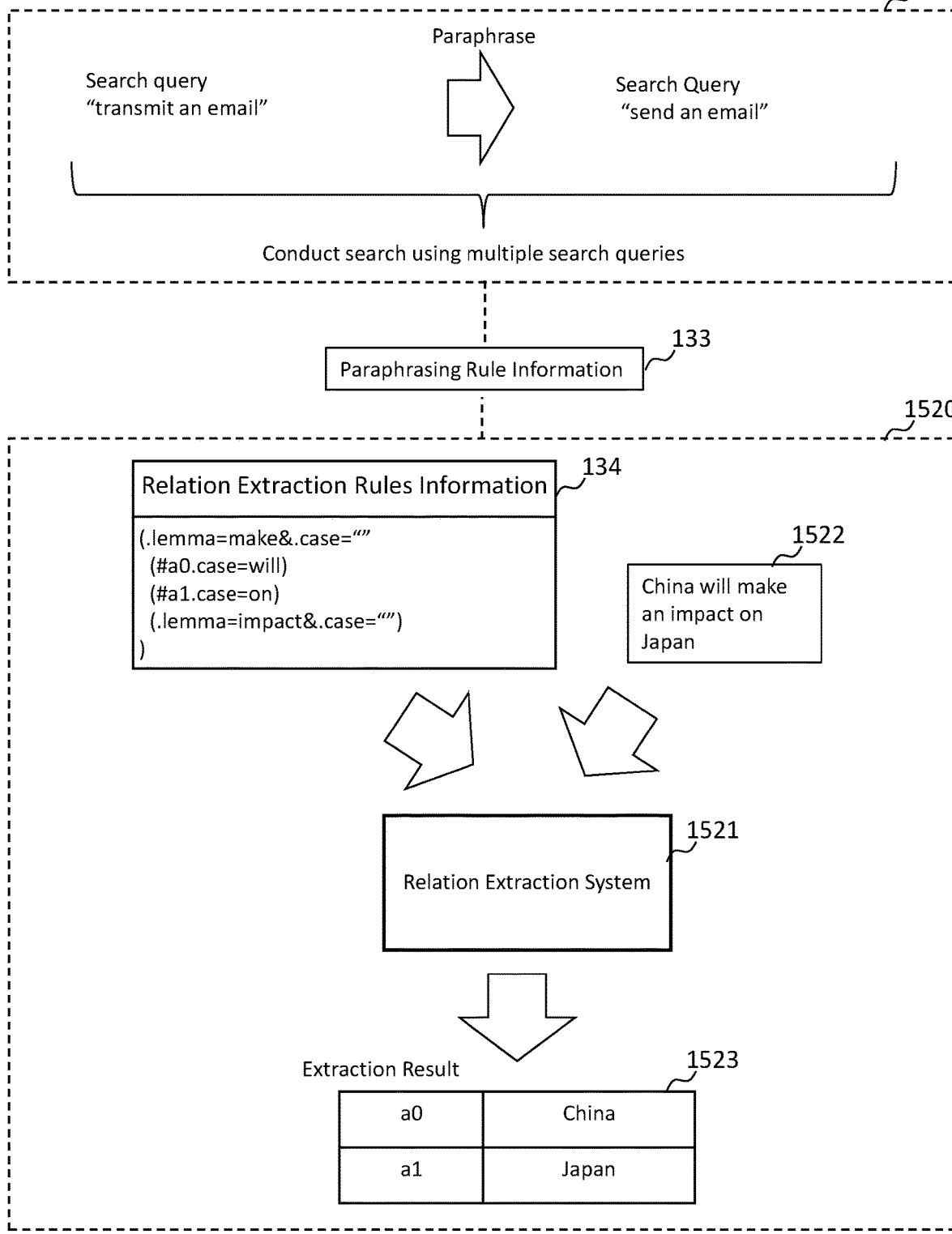
FIG. 15 is a diagram showing an example of the method of use according to the first embodiment.

FIG. 15 is a diagram showing an example of the method of using the paraphrasing rule information 133 and the relation extraction rule information 134.

The paraphrasing rule information 133 can be used for information search 1510. For example, the word processing device 101 creates a search query (for example, "send an email") as a paraphrase of a search query (for example, "transmit an email"). According to this configuration, since information is searched using a plurality of search queries, the user can easily obtain one's intended information.

Moreover, the paraphrasing rule information 133 can be used for relation extraction 1520 by generating the relation extraction rule information 134 as described above. In the relation extraction 1520, the relation extraction system 1521 matches (compares) the syntax tree data of the target sentence 1522 and the relation extraction rules data, and extracts the matched phrase 1523. Note that, as the relation extraction system 1521, the sentence generation system described in, for example, Japanese Unexamined Patent Application Publication No. 2019-83040 may be adopted. Moreover, the relation extraction system 1521 may be included in the word processing system 100, or connected communicably with the word processing device 101.

Moreover, the method of using the paraphrasing rule information 133 is not limited to the method of use explained above. For example, the paraphrasing rule information 133 may also be used for simplifying the expression data. In the foregoing case, the word processing device 101 paraphrases abstruse expression data (for example, "the minister will be removed from office") used in a medium such as a newspaper article or news for children or foreigners to plain expression data (for example, "the minister will be forced to quit"). According to this configuration, since abstruse expression data will be paraphrased into simple expression data, the user will be able to more easily understand the subject matter.

According to this embodiment, it is possible to provide a highly convenient word processing system.

(2) Supplementary Notes

The foregoing embodiment includes, for example, the following subject matter.

While the foregoing embodiment explained a case of applying the present invention to a word processing system, the present invention is not limited thereto, and may be broadly applied to other various systems, devices, methods, and programs.

Moreover, while the foregoing embodiment explained a case where, in S704, the value of the vector is the frequency of a clause, the present invention is not limited thereto, and the value of the vector may also be the existence of a clause.

Moreover, while the foregoing embodiment explained a case where, in S802, the most similar data is used as the similar data, the present invention is not limited thereto, and data which is higher than a predetermined threshold may also be used as the similar data. In the foregoing case, the processing (addition processing 624) of S901 may be omitted. Note that the predetermined threshold is set by the user before the processing of S802 is performed.

Moreover, while the foregoing embodiment explained a case where the addition processing 624 is performed to all paraphrasing rule data after the paraphrasing rule information generation processing 622 (validation processing 622D of all hierarchy data) is completed, the present invention is not limited thereto, and the addition processing 624 (regarding the stored paraphrasing rule data) may also be performed subsequent to the validation processing 622D (S809) with regard to each of the hierarchy data.

Moreover, in the foregoing embodiment, the configuration of each table is an example, one table may be divided into two or more tables, or all or a part of two or more tables may be one table.

Moreover, in the foregoing embodiment, while various types of data were explained using an expression of "XX table" for the sake of convenience in explaining the present invention, the data structure is not limited thereto, and an expression such as "XX information" may also be used.

Moreover, in the foregoing embodiment, the illustrated and explained screens are examples, and may be of any design so as long as the accepted information is the same.

Moreover, in the foregoing embodiment, the output of information is not limited to an indication on a display. The output of information may be a sound output from a speaker, or an output to a file, or printed on a paper medium by a printing device, or projected on a screen or the like by a projector, or may be an output of any other mode.

Moreover, in the foregoing explanation, information of programs, tables, files and the like which realize the respective functions may be stored in a memory, a storage device such as a hard disk or an SSD (Solid State Drive), or in a recording medium such as an IC card, an SD card, or a DVD.

The foregoing embodiment includes, for example, the following characteristic configuration.

A word processing system (for example, word processing system 100) comprises a first generation unit (for example, first generation unit 121, word processing device 101, circuit) which generates, based on sentence information (for example, corpus information 131, a plurality of sentence data) including a plurality of sentences, hierarchy data (for example, hierarchy information 132, hierarchy data) indicating a syntax tree for each hierarchy with regard to each sentence, a second generation unit (for example, second generation unit 122, word processing device 101, circuit) which acquires, from a plurality of hierarchy data generated by the first generation unit, hierarchy data of a second sentence similar to hierarchy data of a first sentence generated by the first generation unit (for example, see S802), extracts a difference between the hierarchy data of the first sentence and the hierarchy data of the second sentence (for example, see S803), and generates, as paraphrasing rule data (for example, paraphrasing rule data), first expression data as a difference in the first sentence and second expression data as a difference in the second sentence, and a storage unit (for example, storage unit 125, word processing device 101, circuit) which stores the paraphrasing rule data generated by the second generation unit in a storage device (for example, auxiliary storage device 130, or external storage device capable of communicating with the word processing system 100).

According to the foregoing configuration, since the difference between the hierarchy data of the first sentence and the hierarchy data of the second sentence; that is, since the first expression data of the first sentence and the second expression data of the second sentence, which is a paraphrased expression of the first expression data, are automatically generated as the paraphrasing rule data, the user can easily obtain paraphrased expressions.

The foregoing word processing system additionally comprises a third generation unit (for example, third generation unit 123, word processing device 101, circuit) which generates syntax tree data of an example sentence (for example, example sentence 610) in which a mark is affixed to a phrase desired by a user (for example, see S1002), modifies the generated syntax tree data into syntax tree data in which the phrase in the generated syntax tree data is set as a symbol (for example, wild card) indicating a phrase which matches all phrases (for example, see S1003), acquires paraphrasing rule data including the modified syntax tree data as expression data from the paraphrasing rule data stored in the storage device (for example, see S1004), and generates extraction rules data (for example, relation extraction rule information 134, relation extraction rules data) in which the modified syntax tree data has been applied to the acquired paraphrasing rule data.

According to the foregoing configuration, for example, the extraction rules data for extracting the phrase desired by the user from arbitrary sentences can be easily generated from the paraphrasing rule data.

The foregoing second generation unit determines whether the first expression data and the second expression data satisfy a condition (for example, paraphrasing condition) for selecting paraphrasing rule data desired by a user (for example, see S805), and generates the first expression data and the second expression data as the paraphrasing rule data upon determining that the first expression data and the second expression data satisfy the condition.

With the foregoing configuration, for example, even using a corpus accumulated with a huge quantity of sentences included in newspapers, magazines, books and the like as the sentence information, there is no need to manually select the sentences that match the condition, and the paraphrasing rule data desired by the user can be appropriately generated.

The foregoing second generation unit acquires hierarchy data using the first expression data from the plurality of hierarchy data (for example, see S806), paraphrases syntax tree data of the acquired hierarchy data with the second expression data, counts a number of the paraphrased syntax tree data included in the plurality of hierarchy data (for example, see S807), and generates the first expression data and the second expression data as the paraphrasing rule data when the counted number exceeds a threshold.

According to the foregoing configuration, for example, it is possible to avoid a situation where paraphrasing rule data, in which the meanings of two expression data are not similar, are registered.

The foregoing word processing system additionally comprises a fourth generation unit (for example, fourth generation unit 124, word processing device 101, circuit) which acquires paraphrasing rule data included in the first expression data from the paraphrasing rule data stored in the storage device (for example, see S902), uses third expression data on a side which differs from the first expression data in the acquired paraphrasing rule data, and the second expression data, as the paraphrasing rule data (for example, see S903), acquires hierarchy data using the second expression data from the plurality of hierarchy data (for example, see S806), paraphrases syntax tree data of the acquired hierarchy data with the third expression data, counts a number of the paraphrased syntax tree data included in the plurality of hierarchy data (for example, see S807), and generates the second expression data and the third expression data as the paraphrasing rule data when the counted number exceeds a threshold.

With the foregoing configuration, for example, the paraphrasing rule data can be efficiently generated.

The foregoing word processing system additionally comprises an output unit (for example, output unit 126, word processing device 101, circuit) which outputs all or a part of the paraphrasing rule data stored in the storage device.

With the foregoing configuration, since the paraphrasing rule data is output, for example, the user can easily obtain the paraphrasing rule data.

Moreover, the foregoing configurations may be changed, rearranged, combined or omitted as needed to the extent that such change, rearrangement, combination or omission does not exceed the subject matter of the present invention.

REFERENCE SIGNS LIST

100 . . . word processing system, 101 . . . word processing device, 121 . . . first generation unit, 122 . . . second generation unit.

The invention claimed is:

1. A word processing system, comprising:
a first generation unit which generates, based on sentence information including a plurality of sentences, hierarchy data indicating a syntax tree for each hierarchy with regard to each sentence;
a second generation unit which
acquires, from a plurality of hierarchy data generated by the first generation unit, hierarchy data of a second sentence similar to hierarchy data of a first sentence generated by the first generation unit,
extracts a difference between the hierarchy data of the first sentence and the hierarchy data of the second sentence, and
generates, as paraphrasing rule data, first expression data as a difference in the first sentence and second expression data as a difference in the second sentence; and
a storage unit which stores the paraphrasing rule data generated by the second generation unit in a storage unit,
wherein the plurality of sentences including the first sentence and the second sentence are in a same natural language,
wherein the first sentence and the second sentence are similar as paraphrases and are not identical,
wherein the first expression data consists of nodes in a syntax tree of the second sentence that are not present in a syntax tree of the first sentence,
wherein the second expression data consists of nodes in the syntax tree of the first sentence that are not present in the syntax tree of the second sentence, and
wherein the paraphrasing rule data converts the first expression data into the second expression data.

2. The word processing system according to claim 1, further comprising:
a third generation unit which generates syntax tree data of an example sentence in which a mark is affixed to a phrase desired by a user, modifies the generated syntax tree data into syntax tree data in which the phrase in the generated syntax tree data is set as a symbol indicating a phrase which matches all phrases, acquires paraphrasing rule data including the modified syntax tree data as expression data from the paraphrasing rule data stored in the storage device, and generates extraction rules data in which the modified syntax tree data has been applied to the acquired paraphrasing rule data.

3. The word processing system according to claim 1, wherein the second generation unit determines whether the first expression data and the second expression data satisfy a condition for selecting paraphrasing rule data desired by a user, and generates the first expression data and the second expression data as the paraphrasing rule data upon determining that the first expression data and the second expression data satisfy the condition.

4. The word processing system according to claim 1, wherein the second generation unit acquires hierarchy data using the first expression data from the plurality of hierarchy data, paraphrases syntax tree data of the acquired hierarchy data with the second expression data, counts a number of the paraphrased syntax tree data included in the plurality of hierarchy data, and generates the first expression data and the second expression data as the paraphrasing rule data when the counted number exceeds a threshold.

5. The word processing system according to claim 1, further comprising:
a fourth generation unit which acquires paraphrasing rule data included in the first expression data from the paraphrasing rule data stored in the storage device, uses third expression data on a side which differs from the first expression data in the acquired paraphrasing rule data, and the second expression data, as the paraphrasing rule data, acquires hierarchy data using the second expression data from the plurality of hierarchy data, paraphrases syntax tree data of the acquired hierarchy data with the third expression data, counts a number of the paraphrased syntax tree data included in the plurality of hierarchy data, and generates the second expression data and the third expression data as the paraphrasing rule data when the counted number exceeds a threshold.

6. The word processing system according to claim 1, further comprising:
an output unit which outputs all or a part of the paraphrasing rule data stored in the storage device.

7. A word processing method, comprising the steps of:
a first generation unit generating, based on sentence information including a plurality of sentences, hierarchy data indicating a syntax tree for each hierarchy with regard to each sentence;
a second generation unit acquiring, from a plurality of hierarchy data generated by the first generation unit, hierarchy data of a second sentence similar to hierarchy data of a first sentence generated by the first generation unit, extracting a difference between the hierarchy data of the first sentence and the hierarchy data of the second sentence, and generating, as paraphrasing rule data, first expression data as a difference in the first sentence and second expression data as a difference in the second sentence; and
a storage unit storing the paraphrasing rule data generated by the second generation unit,
wherein the plurality of sentences including the first sentence and the second sentence are in a same natural language,
wherein the first sentence and the second sentence are similar as paraphrases and are not identical,
wherein the first expression data consists of nodes in a syntax tree of the second sentence that are not present in a syntax tree of the first sentence,
wherein the second expression data consists of nodes in the syntax tree of the first sentence that are not present in the syntax tree of the second sentence, and wherein the paraphrasing rule data converts the first expression data into the second expression data.

* * * * *